United States Patent
Murasawa et al.

(10) Patent No.: US 7,931,109 B2
(45) Date of Patent: Apr. 26, 2011

(54) ARRANGEMENT OF IGNITION COILS AND COIL-HOLDING STRUCTURE IN A MOTORCYCLE, AND MOTORCYCLE INCLUDING SAME

(75) Inventors: Naoki Murasawa, Saitama (JP); Kenta Nakamura, Saitama (JP); Masaru Nakayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 226 days.

(21) Appl. No.: 12/315,412

(22) Filed: Dec. 3, 2008

(65) Prior Publication Data
US 2009/0194351 A1    Aug. 6, 2009

(30) Foreign Application Priority Data
Jan. 31, 2008   (JP) ................................. 2008-021958

(51) Int. Cl.
*B62D 61/02* (2006.01)
*B62K 11/00* (2006.01)
*F02P 3/02* (2006.01)

(52) U.S. Cl. ....................................... 180/219; 123/635

(58) Field of Classification Search ................... 123/635; 180/219
See application file for complete search history.

(56) References Cited

U.S. PATENT DOCUMENTS

| | | | | |
|---|---|---|---|---|
| 3,944,009 A * | 3/1976 | Katagiri | ......................... | 180/219 |
| 5,590,637 A * | 1/1997 | Motodate | ....................... | 123/634 |
| 5,701,853 A * | 12/1997 | Takahashi | ................... | 123/41.33 |
| 6,234,265 B1 * | 5/2001 | Wollmer | ......................... | 180/219 |
| 6,336,321 B1 * | 1/2002 | Sagara et al. | .................... | 60/324 |
| 6,779,620 B2 | 8/2004 | Taniguchi et al. | | |
| 7,270,210 B2 * | 9/2007 | Katsura | ......................... | 180/219 |
| 7,588,009 B2 * | 9/2009 | Kurokawa et al. | .......... | 123/193.5 |
| 2002/0189877 A1 * | 12/2002 | Yagisawa et al. | ............. | 180/219 |
| 2005/0082101 A1 * | 4/2005 | Inomori et al. | ............... | 180/219 |
| 2006/0054375 A1 * | 3/2006 | Kakinuma | ..................... | 180/282 |

FOREIGN PATENT DOCUMENTS
JP    10-329772    12/1998

* cited by examiner

*Primary Examiner* — Paul N Dickson
*Assistant Examiner* — Marc A Scharich
(74) *Attorney, Agent, or Firm* — Carrier Blackman & Associates, P.C.; William D. Blackman; Joseph P. Carrier (57) ABSTRACT

A motorcycle includes a fuel tank mounted on a main frame member, an engine arranged below the main frame member, and ignition coils arranged below the fuel tank. The main frame member includes a pair of sub-frame members arranged in a vehicle-width direction in a spaced-apart manner. A coil-holding structure, formed of a plastic resin material, is disposed on the main frame member for arranging the ignition coils thereon between the pair of sub-frame members. A base portion of the coil-holding structure has one or more openings formed therein so as to expose portions of the ignition coils to a traveling wind, during vehicle operation. One of the ignition coils, which is arranged close to a rear side of a vehicle body, is disposed at a position lower than a position of the ignition coil which is arranged close to a front side of the vehicle body.

19 Claims, 6 Drawing Sheets

ARRANGEMENT OF IGNITION COILS AND COIL-HOLDING STRUCTURE IN A MOTORCYCLE, AND MOTORCYCLE INCLUDING SAME

CROSS-REFERENCE TO RELATED APPLICATIONS

The present application claims priority under 35 USC §119 based on Japanese patent application No. 2008-021958, filed on Jan. 31, 2008. The entire subject matter of this priority document, including specification, claims and drawings, is incorporated by reference herein.

BACKGROUND OF THE INVENTION

1. Field of the Invention

The present invention relates to a motorcycle having a main frame member, a fuel tank mounted on the main frame member, an ignition coil arranged below the fuel tank, and a coil-holding structure for holding the ignition coil. More particularly, the present invention relates to an arrangement of a coil-holding structure in a motorcycle for placing the ignition coils inconspicuously below the fuel tank without decreasing a capacity of the fuel tank, and which, during vehicle operation, facilitates dissipation of heat from the ignition coils.

2. Description of the Background Art

There are several known arrangements of disposing an ignition coil on a vehicle body of a motorcycle. During vehicle operation, the ignition coil applies a high voltage to an ignition plug of an engine of the motorcycle.

For example, the Japanese Patent Document JP-A-10-329772 discloses an ignition coil mounting structure for a motorcycle, in which an ignition coil is fixed to an inside portion of a lower cover, formed of a synthetic resin component, assembled in a leg shield of the motorcycle.

According to the ignition coil-holding structure as described in the Japanese Patent Document JP-A-10-329772, the ignition coil is fixed to the inside portion of the lower cover formed of the synthetic resin component. Hence, a heat-radiation effect of the ignition coil cannot be expected. The heat-radiation effect is particularly important with respect to an ignition coil of a high-output full-transistor-type ignition device since a primary coil thereof generates a large, unwanted heat.

Accordingly, it is necessary to take measures to radiate heat from the ignition coil. For enhancing a heat-radiation effect, it may be possible to adopt the structure which mounts a metallic stay on a frame body of the motorcycle, and fixes an iron core portion of the ignition coil to the stay by fastening bolts.

However, when the iron core portion of the ignition coil is mounted on the metallic stay, a closed magnetic circuit including the stay and the frame body is formed, and a secondary voltage of the ignition coil is lowered due to a core loss attributed to such a closed magnetic circuit. Accordingly, it is necessary to interpose a washer made of a non-magnetic material such as stainless steel between the iron core portion of the ignition coil and the metallic stay. Also, it is necessary to use bolts and nuts made of a non-magnetic material for fastening the ignition coil to the metallic stay.

In order to diffuse heat using the metallic stay, it may be possible to shorten a time for supplying electricity to a primary coil of the ignition coil. However, such a measure cannot increase a secondary voltage of the ignition coil. Accordingly, from a viewpoint of a demand for enhancing an air-fuel ratio and drivability of a motorcycle, it is not realistic to shorten the time for supplying electricity to the primary coil of the ignition coil.

Further sometimes, in a motorcycle, an ignition coil is arranged on a side surface of a main frame member. However, when a main frame member is formed by arranging a pair of sub-frame members in a vehicle width direction, such as in a case of a main frame member of a double cradle type frame which is often adopted by a custom-type motorcycle, a fuel tank is arranged astride the main frame member including the ignition coil which is mounted on a side surface of the main frame member. Hence, a large capacity of the fuel tank cannot be ensured.

The present invention has been made to overcome such drawbacks of existing arrangement of ignition coils. Accordingly, it is an object of the present invention to overcome the above-mentioned drawbacks of the related art, and to provide a motorcycle including the ignition-coil-holding structure which is suitable for enhancing a heat diffusing efficiency of an ignition coil without depending on the heat dissipation via a metallic stay.

Further, it is an object of the present invention to provide a motorcycle having a coil-holding structure which can arrange one or more ignition coils inconspicuously in appearance, and which can ensure a large capacity of a fuel tank mounted on a main frame member of the motorcycle.

SUMMARY OF THE INVENTION

In order to achieve the above-mentioned objects, the present invention according to a first aspect thereof provides a motorcycle including a main frame member, a fuel tank mounted on the main frame member, an engine arranged at a position below the main frame member, an ignition coil is arranged at a position below the fuel tank and a coil-holding structure disposed on the main frame member for holding the ignition coil. The main frame member includes a pair of sub-frame members arranged in a spaced apart manner in a vehicle-width direction. The coil-holding structure is arranged to extend between the pair of sub-frame members so as to position the ignition coil between the pair of sub-frame members. The coil-holding structure may be formed of a material comprising a plastic resin. The coil-holding structure may be formed of other suitable non-metallic and non-magnetic material.

The present invention according to a second aspect thereof is characterized in that the coil-holding structure includes a base for holding the ignition coil thereon, and an opening is formed in the base so as to allow a portion of the ignition coil to face downwardly. The ignition stay is arranged in a substantially horizontal manner.

The present invention according to a third aspect thereof is characterized in that the engine is a multi-cylinder engine, and a plurality of ignition coils for respective cylinders is arranged in a row in the longitudinal direction of the vehicle body, one of the plurality of ignition coils which is arranged close to a rear side of the vehicle body is displaced downwardly (at a lower position) relative to an ignition coil which is arranged close to a front side of the vehicle body.

Further, the present invention according to a fourth aspect thereof is characterized in that the engine is a two-cylinder-type engine and two ignition coils are provided corresponding to two cylinders. One of the two ignition coils which is arranged close to the front side of the vehicle body is mounted at upper portion (from above) of the base so as to allow a portion of the one ignition coil to face a position below the base through the opening, and the other ignition coil which is arranged close to the rear side of the vehicle body is mounted at a lower portion (from below) so as to allow a portion of the ignition coil to face a position above the base through the opening. Such arrangement facilitates displacing the ignition coil which is arranged close to the rear side of the vehicle body downwardly relative to the ignition coil which is arranged close to the front side of the vehicle body.

Further, the present invention according to a fifth aspect thereof is characterized in that the motorcycle includes a hanger bracket for hangingly supporting the engine. The hanger bracket includes a pair of plate members, each respectively projecting downwardly from the pair of sub-frame members of the main frame member, and the ignition coil arranged close to the rear side of the vehicle body is arranged directly above a gap between the pair of plate members.

ADVANTAGES OF THE INVENTION

According to the first aspect of the present invention, by arranging the ignition coil between the two sub-frame members of the main frame member, it is possible to make the ignition coil inconspicuous in appearance. It is also possible to reduce a projecting portion of the ignition coil in a vertical direction from the main frame member. Hence, it is possible to prevent limiting a capacity of the fuel tank due to mounting of the ignition coil above the main frame member.

According to the second aspect of the present invention, the ignition coil is arranged to face downwardly from the base of the coil-holding structure which is arranged in a substantially horizontal manner. Hence, during vehicle operation, it is possible to allow a traveling wind to impinge on the ignition coil directly from below.

Accordingly, during vehicle operation, it is possible to cool the ignition coil using the traveling wind without depending on the structure, such as a metallic stay, which releases heat generated by the ignition coil to the vehicle body frame. As a result, it is not necessary to use a metallic stay, non-magnetic bolts or washers for preventing the formation of a closed magnetic circuit or the like.

According to the third and fourth aspects of the present invention, the ignition coil arranged at the rear portion the holding structure is disposed downwardly in comparison to the ignition coil arranged at the front portion the holding structure. Due to such constitution, when the plurality of ignition coils are arranged in a row (in series) in a longitudinal direction of the vehicle body, it is possible to prevent a traveling wind from being blocked by the ignition coil arranged on the front side. Hence, a cooling effect of the ignition coil arranged on the rear side can be ensured.

Particularly, according to the fourth aspect of the present invention, the second (rear) ignition coil is mounted on the base of the coil-holding structure from below (at a lower portion) and the first (front) ignition coil is mounted on the base from above (at an upper portion). Hence, out of these two ignition coils, the rear ignition coil can be displaced downwardly at a position lower than a position of the front ignition coil.

According to the fifth aspect of the present invention, the traveling wind can pass through a gap between the pair of plate members of the hanger bracket. Hence, a lower portion of the rear ignition coil which is arranged directly above the hanger bracket can be cooled with the traveling wind.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 1:
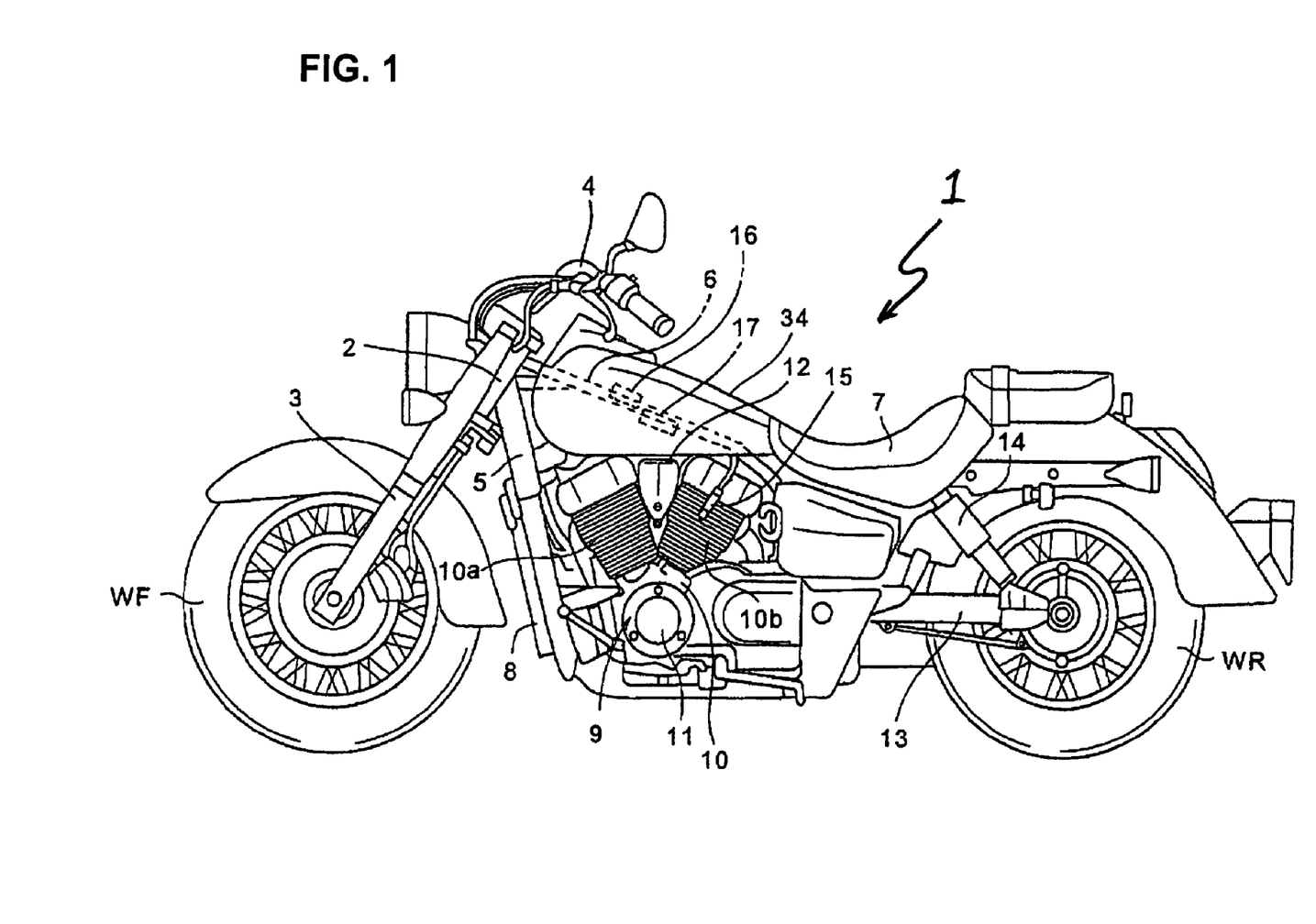
FIG. 1 is a left side view of a motorcycle according to an illustrative embodiment of the present invention.

Hereinafter, an illustrative embodiment of the present invention is explained in conjunction with drawings. FIG. 1 is a left side view of a motorcycle 1 according to the illustrative embodiment of the present invention.

As shown in FIG. 1, the motorcycle 1 includes a front fork 3 rotatably supported on a head pipe 2 mounted on a front portion of a vehicle-body frame, a steering handle 4 mounted on an upper portion of the front fork 3, and a front wheel WF supported on a lower portion of the front fork 3.

A front end of a down pipe frame member 5 is joined with the head pipe 2. The down pipe frame member 5 extends downwardly from the head pipe 2. Also, a front end of a main frame member 6 is joined to the head pipe 2. The main frame member 6 extends downwardly and rearwardly from the head pipe 2.

The down pipe frame member 5 and the main frame member 6 extend in the rearward direction of the vehicle body and are joined to each other at a position below a pillion seat 7. The down pipe frame member 5 includes a pair of pipes 5b, 5c extending downwardly from the head pipe 2. The pipes 5b, 5c are spaced apart from one another in a vehicle-width direction. A radiator 8 is mounted on these two pipes 5b, 5c of the down pipe frame member 5.

A power unit 9 including an engine 10 and a transmission unit 11 is arranged between the down pipe frame member 5 and the main frame member 6. The power unit 9 is disposed on the down pipe frame member 5. The engine 10 is a V-type two-cylinder-type engine. An air cleaner 12, and an intake pipe (not shown) including a fuel injection valve (not shown) and a throttle valve (not shown) are arranged between two cylinders 10a, 10b, i.e., between a front cylinder 10a and a rear cylinder 10b, of the engine 10.

A propeller shaft 13 for transmitting a rotary power of the engine 10 to a rear wheel WR using a shaft drive system is mounted on the motorcycle 1. The pillion seat 7 is arranged on a seat pipe (not shown). The rear wheel WR is suspended on a rear cushion member 14 having an upper end thereof joined to the seat pipe.

A fuel tank 34 is mounted on the main frame member 6. The fuel tank 34 has a saddle-ride shape which strides over the main frame member 6 in a vehicle width direction. In other words, a bottom portion of the fuel tank 34 is formed of a recessed portion, and the main frame member 6 passes thorough the recessed portion in a longitudinal direction of the vehicle body.

Also on the main frame member 6, a pair of ignition coils 16, 17, for applying high voltages to the ignition plug 15 of the engine 10, are arranged above the engine 10. The ignition coils 16, 17 are respectively formed of an ignition coil of a full-transistor-type ignition device. In the drawing, although only one ignition plug 15 mounted on the rear cylinder 10b is shown, another ignition plug 15 is mounted on the front cylinder 10a in a similar manner. The ignition coil 16 is operatively connected with the ignition plug (not shown) of the front cylinder 10a, and the ignition coil 17 is operatively connected with the ignition plug 15 of the rear cylinder 10b.

Figure 2:
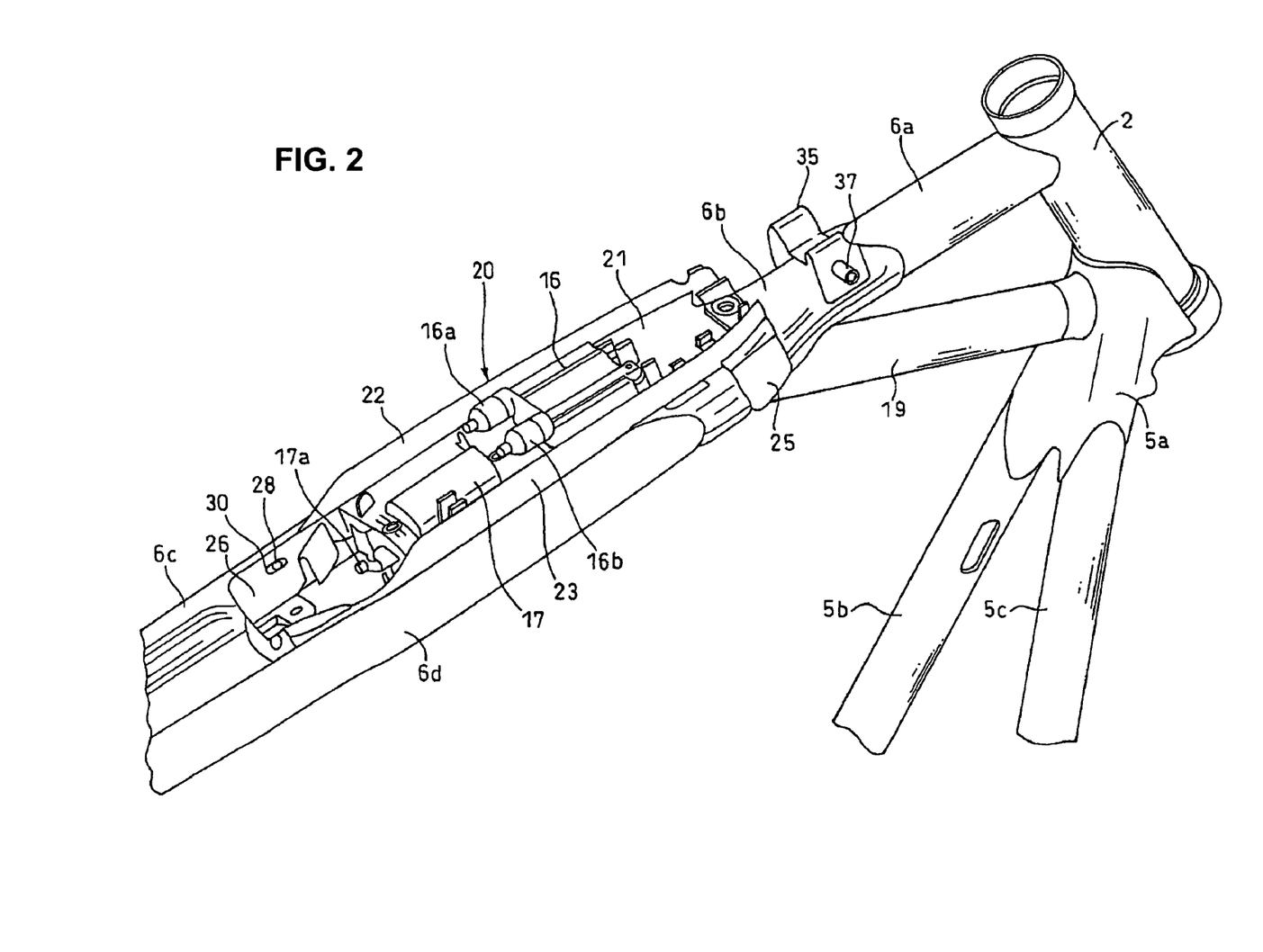
FIG. 2 is a right side perspective view showing an essential portion of a vehicle body frame of the motorcycle according to the illustrative embodiment of the present invention.
Figure 3:
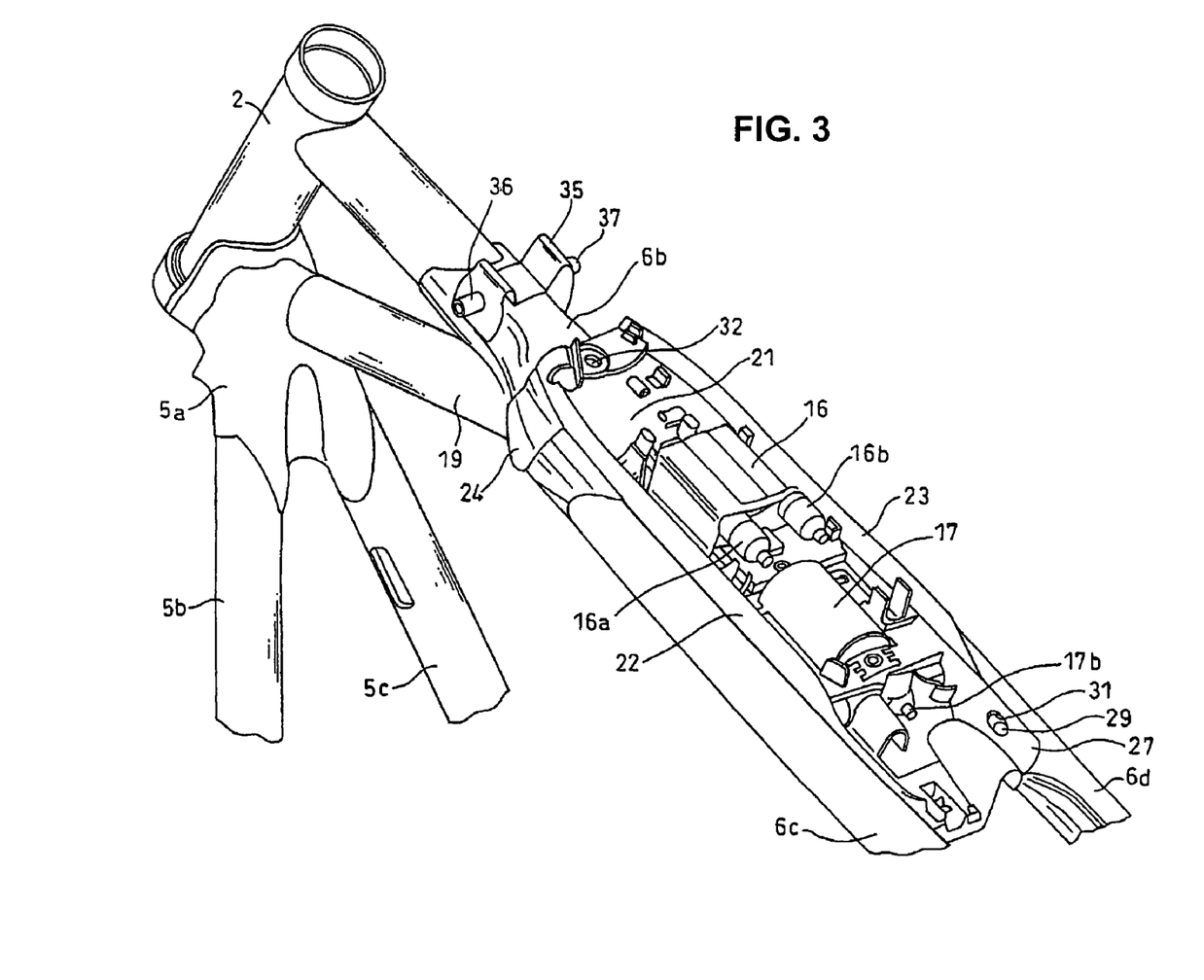
FIG. 3 is a left side perspective view showing the essential portion of the vehicle body frame of the motorcycle according to the illustrative embodiment of the present invention.
Figure 4:
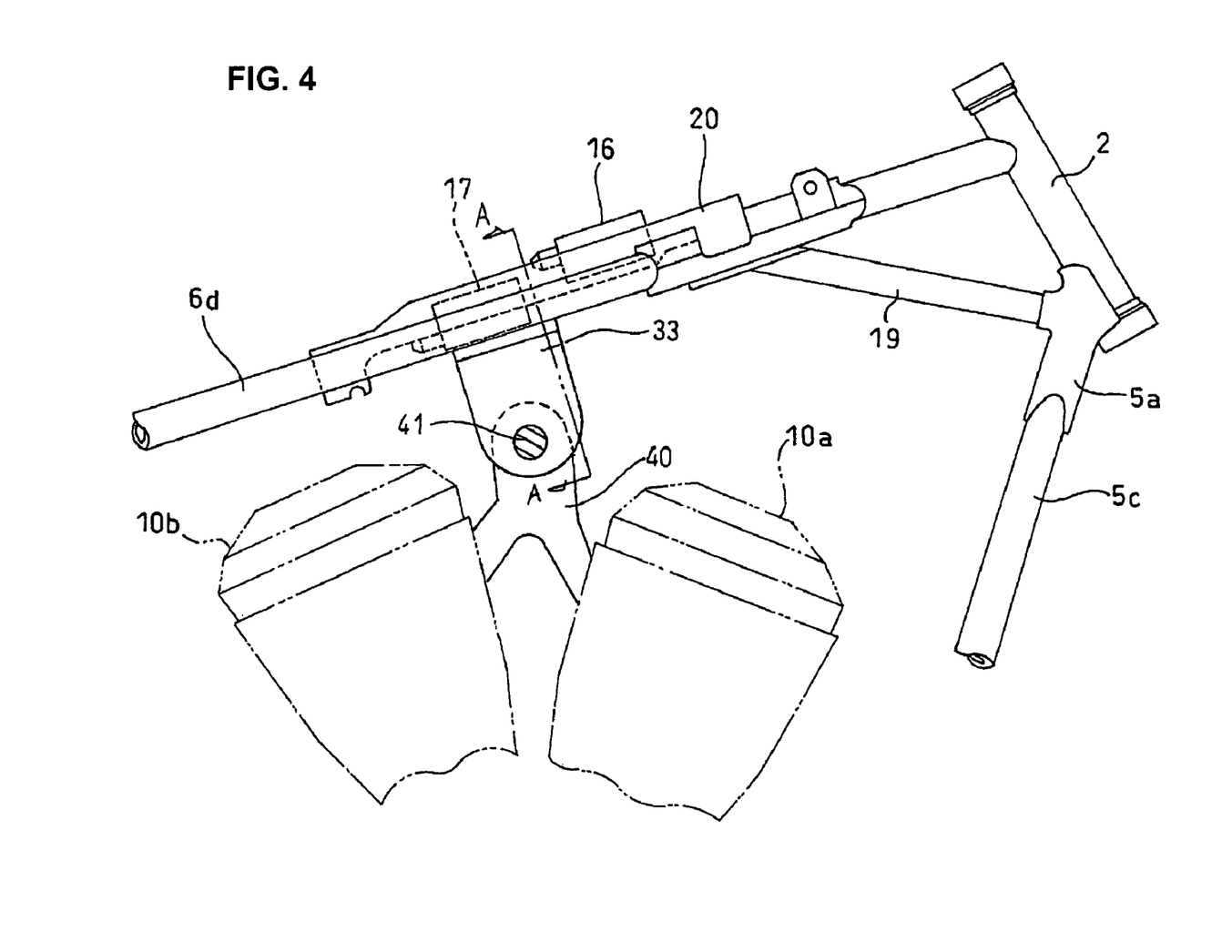
FIG. 4 is a right side view showing the essential portion of the vehicle body frame of the motorcycle according to the illustrative embodiment of the present invention.
Figure 5:
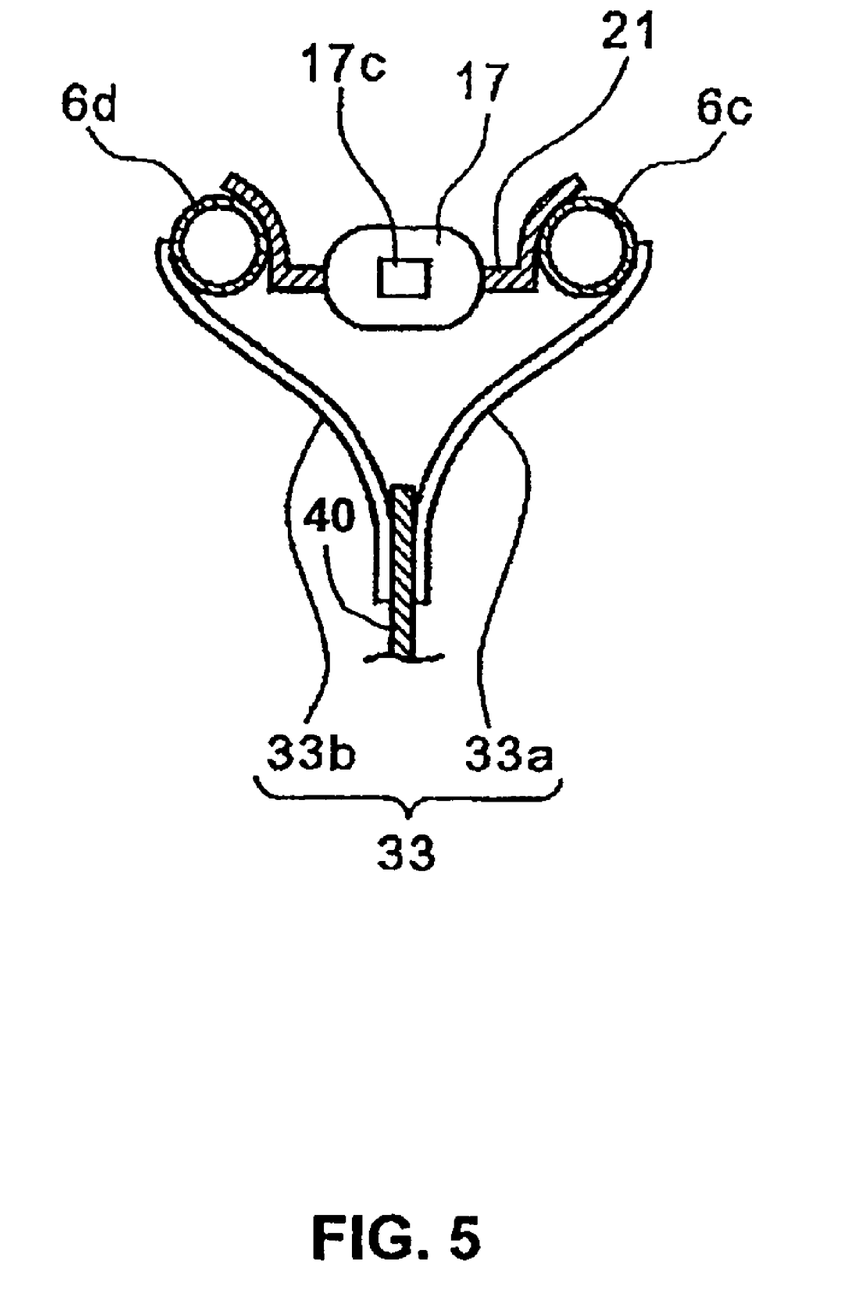
FIG. 5 is a cross-sectional view taken along a line A-A in FIG. 4.

The arrangement of the ignition coils 16, 17 is further explained with reference to FIGS. 2-6. FIG. 2 is a right side perspective view showing an essential portion of the vehicle body frame. FIG. 3 is a left side perspective view showing the essential portion of the vehicle body frame. FIG. 4 is a right side view of the essential portion of the vehicle body frame. FIG. 5 is a cross-sectional view taken along a line A-A in FIG. 4.

As shown in FIG. 2 through FIG. 5, the main frame member 6 includes a front portion 6a having a front end thereof joined to the head pipe 2, a gusset 6b having one end thereof joined to a rear end of the front portion 6a, and a pair of spaced-apart sub-frame members (also referred to herein as rear portions) 6c, 6d, where each of the sub-frame members is respectively joined to the front portion 6a via the gusset 6b of the main frame member 6.

In other words, the main frame member 6 has a front end thereof joined to the head pipe 2. A rear portion of the main frame member 6 formed into a bifurcated shape including the pair of sub-frame members 6c, 6d.

The down pipe frame member 5 includes a gusset 5a, and the pair of pipes 5b, 5c each respectively having front end thereof joined to the gusset 5a. The gusset 5a of the down pipe frame member 5 is joined to the head pipe 2. A reinforcing pipe 19 is arranged between the gusset 5a of the down pipe frame member 5 and the gusset 6b of the main frame member.

An ignition coil-holding structure 20 made of a plastic resin material is mounted on the main frame member 6 such that the coil-holding structure 20 extends in the longitudinal direction of the vehicle body. The coil-holding structure may be formed of a suitable non-metallic, non-magnetic material.

The coil-holding structure 20 includes an ignition coil-holding base 21 or beam (also referred as a holding base 21) and flanges 22, 23. The holding base 21 is arranged at a longitudinally central portion of the coil-holding structure 20. The flanges 22, 23 are positioned in the vehicle width direction of the holding base 21 and extend in the longitudinal direction of the holding base 21.

Wings 24, 25 are mounted on a left side of a front portion of the flange 22 and on a right side of a front portion of the flange 23, respectively. Further, tails 26, 27 are mounted on rear end portions of the flanges 22, 23 in a downwardly and rearwardly extending manner. Shapes of the wings 24, 25 are determined to trace left and right outer peripheral surfaces of the gusset 6b, and shapes of the tails 26, 27 are complimentary to tracing of outer peripheral surfaces of the rear portions 6c, 6d of the main frame member 6.

The wings 24, 25 are attached to left and right sides of the gusset 6b from the outside portion thereof, respectively. The tails 26, 27 are attached to left and right sides of the rear portions 6c, 6d from the inside portion thereof, respectively, thus holding the coil-holding structure 20 on the main frame member 6. Further, the coil-holding structure 20 is fixed to the main frame member 6 by fastening a front portion thereof to the gusset 6b of the main frame member 6 using a bolt and by fastening a rear portion thereof to the rear portions 6c, 6d of the main frame member 6 using bolts.

The coil-holding structure 20 is fixed to the main frame member 6 by fastening the bolts in threaded holes 28, 29 formed in the rear portions 6c, 6d of the main frame member, respectively. Elongated holes 30, 31 corresponding to respective threaded holes 28, 29 are formed in the tails 26, 27. Further, a hole 32 which allows a bolt to pass therethrough is formed in a front portion of the coil-holding structure 20. A threaded hole (not shown) which conforms to the hole 32 is formed in an upper surface of the gusset 6b of the main frame member.

The holding base 21 has openings formed therein. The ignition coils 16, 17 are fitted the openings formed in the holding base 21. The ignition coils 16, 17 are respectively fitted in the openings and iron cores of the respective ignition coils 16, 17 and the holding base 21 are joined and fixed to each other using bolts, as described herein.

The ignition coil 16 is arranged such that high-voltage output terminals (also referred "output terminal") 16a, 16b of the ignition coil 16 are positioned on an upper side of the holding base 21. The ignition coil 17 is arranged such that output terminals 17a, 17b of the ignition coil 17 are positioned on a lower side of the holding base 21.

In other words, the ignition coils 16, 17 have the same shape and are mounted on the holding base 21 in such that the ignition coils 16, 17 are vertically reversed from each other. Accordingly, when viewed in a side view, the front ignition coil 16 and the rear ignition coil 17 are arranged in different levels (stages) such that the front ignition coil 16 situated on a front side of the vehicle body is arranged at a position above the rear ignition coil 17 on a rear side of the vehicle body.

Cables (not shown) are connected to the output terminals 16a, 16b, 17a and 17b. The cables are pulled out towards a rear side of the coil-holding structure 20, and are bent downwardly, are connected to the ignition plugs 15 or the like mounted on the cylinders 10a, 10b of the engine 10.

As shown in FIG. 4 and FIG. 5, a hanger bracket 33 for suspending the engine 10 (from the main frame member 6) is joined to the main frame member 6. The hanger bracket 33 is arranged at a position substantially directly below the ignition coil 17. The hanger bracket includes a pair of plate members 33a, 33b arranged in the vehicle width direction.

Upper ends of the respective plate members 33a, 33b are joined to the rear portions 6c, 6d of the main frame member 6, and respective lower portions of the plate members 33a, 33b are fastened to an attachment member 40 which extends from the front cylinder 10a and the rear cylinder 10b of the engine 10 using a bolt 41.

In other words, the rear ignition coil 17 is arranged between the pair of plate members 33a, 33b of the hanger bracket 33 at an upper portion of the hanger bracket 33.

As shown in FIG. 3, a fitting member 35 is fastened to the gusset 6b of the main frame member 6 using a bolt. The fitting member 35 includes pins 36, 37 engaged with a stay (not shown) mounted on the bottom portion of the fuel tank 34, thus holding the fuel tank 34 on the main frame member 6.

The manner of operation for providing cooling to the ignition coils 16, 17 according to the illustrative embodiment of the present invention is explained with reference to FIG. 6.

Figure 6:
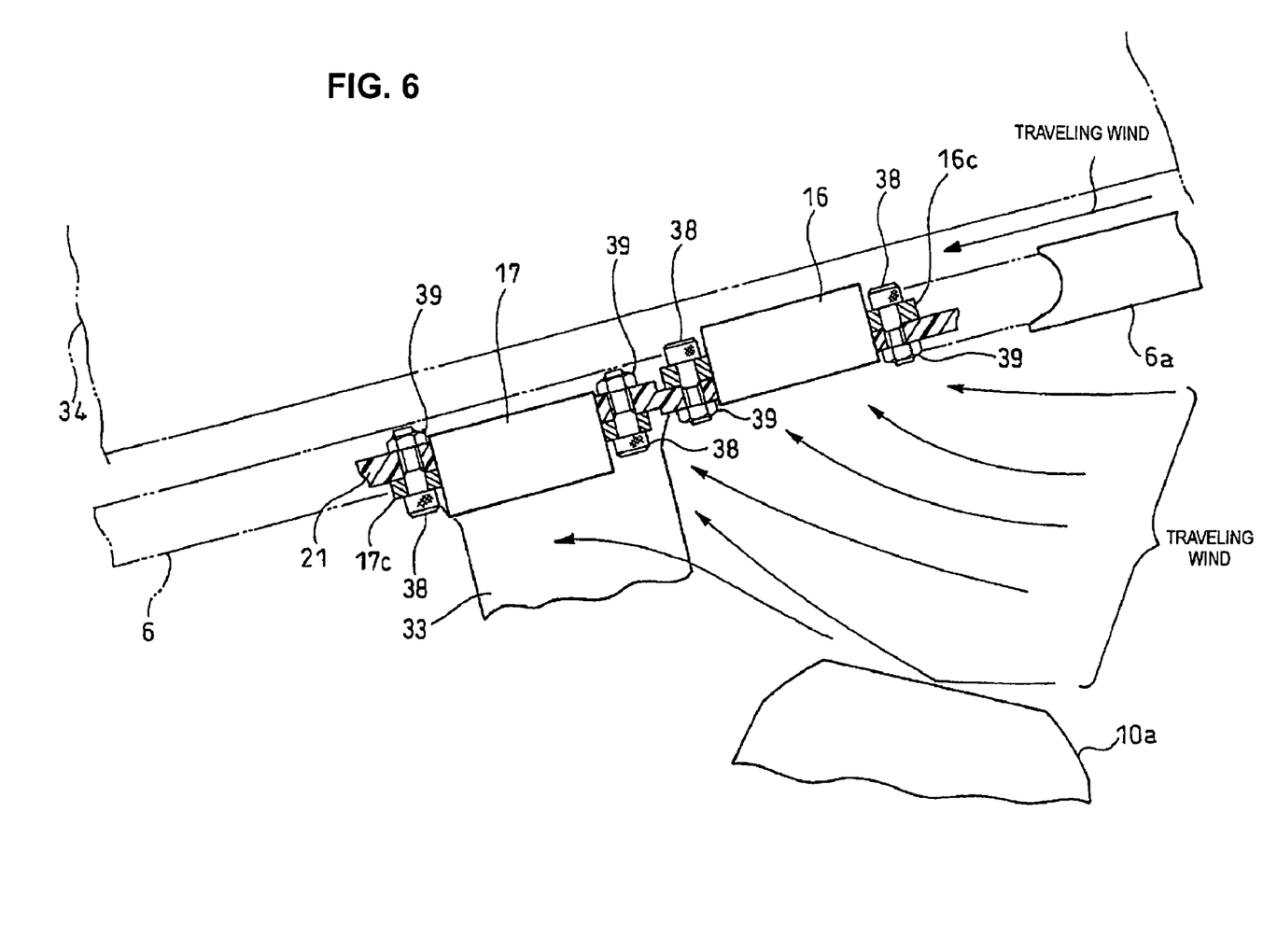
FIG. 6 is a side view showing an essential portion of an ignition coil-holding structure and a plurality of ignition coils, and direction of traveling wind during vehicle operation.

FIG. 6 is a side view showing an essential portion of the coil-holding structure 20 and the ignition coils 16, 17. In FIG. 6, parts identical with the parts shown in FIG. 4 are given same reference numerals. In FIG. 6, a right side indicates a front side of the motorcycle 1, that is, a traveling direction of the motorcycle.

The ignition coils 16, 17 respectively include the iron cores 16c, 17c, which respectively penetrate the ignition coils 16, 17 and project outwardly. Further, projecting portions of the iron cores 16c, 17c are respectively fixed to the coil-holding structure 20 using bolts 38 and nuts 39. Here, the nuts 39 used for joining the iron cores 16c, 17c and the coil-holding structure 20 may not be provided as separate parts from the coil-holding structure 20 but may be mounted on the holding base 21 of the coil-holding structure 20 as insert nuts.

As it will be clearly understood from FIG. 6, during operation of the vehicle, a traveling wind flows into a gap defined between the main frame member 6 and the front cylinder 10a of the engine 10 as indicated by arrows, and the ignition coil 16 having a lower portion thereof exposed downwardly from the opening formed in the holding base 21 receives the traveling wind.

Further, since the hanger bracket 33 is positioned below the ignition coil 17 arranged at a rear of the ignition coil 16, the ignition coil 17 is offset in a vertical direction relative to the ignition coil 16 such that the ignition coil 16 is positioned above the ignition coil 17.

Accordingly, during operation of the vehicle, the traveling wind impinges on a front portion (surface) of the ignition coil 17, which is arranged behind the ignition coil 16. The traveling wind passes through a gap defined between the hanger bracket 33 and the ignition coil 17. Further, the traveling wind passes through a gap defined between the fuel tank 34 and the main frame member 6 thus cooling upper portions (surfaces) of the ignition coils 16, 17.

On an upper portion (cylinder head) of the cylinder 10a, a plated ornamental cover is mounted for blocking the radiation heat. The ornamental cover also plays a role of guiding the traveling wind toward side portion of the ignition coils 16, 17.

Such arrangement of the ignition coils 16, 17 according to the present invention is advantageous over an arrangement, in which, for example, two ignition coils are arranged in a row in a longitudinal direction along the main frame member of the motorcycle and setting heights (positions) of two ignition coils 16, 17 are not displaced from each other because the traveling wind impinges on the hanger bracket which suspends the engine downwardly and the like and hence, the traveling wind hardly impinges on side portion of the rear the ignition coil.

According to the illustrative embodiment, the traveling wind easily impinges on both the ignition coils 16, 17. Hence, although the coil-holding structure 20 is made of a plastic resin and the ignition coils 16, 17 are not in direct contact with a metallic member, both the ignition coils 16, 17 are sufficiently cooled by the traveling wind.

Accordingly, in the motorcycle which mounts the high-output full-transistor type ignition device thereon, it is possible to enhance the cooling effect of the ignition coils without mounting a metallic stay for heat radiation on the main frame member 6 or the like and/or without requirement of the non-magnetic bolts or washers.

The present invention is not limited to the above-mentioned illustrative embodiment. The engine is not limited to the two-cylinder-type engine and may be an engine having three or more cylinders or may be a single-cylinder engine.

The present invention is characterized in that the motorcycle includes the main frame member having a pair of sub-frame members arranged in the vehicle width direction in a spaced-apart manner. The motorcycle may include the coil-holding structure configured and arranged such that the ignition coils are arranged between the pair of sub-frame members of the main frame member in a manner contacting each of the sub-frame members. Openings may be formed in the base of the coil-holding structure such that the ignition coils are respectively mounted therein and oriented to face downwardly from the coil-holding structure.

Further, in mounting a plurality of ignition coils on the motorcycle, the ignition coils may be arranged in a row in the longitudinal direction of the vehicle body, and the ignition coil arranged on a rear side may be disposed at a position higher or lower than a position of the ignition coil arranged on a front side.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle comprising:
   a frame comprising a head pipe, a main frame member extending rearwardly from the head pipe, and a pair of down tubes extending downwardly from the head pipe below the main frame member;
   a fuel tank arranged at a position above the main frame member;
   an engine arranged at a position below the main frame member;
   a coil-holding structure disposed on the main frame member; said coil-holding structure configured to receive at least one ignition coil thereon; and
   at least one ignition coil received in said coil-holding structure at a position below the fuel tank;
   wherein:
   said main frame member includes a pair of sub-frame members spaced apart from one another in a vehicle-width direction;
   said coil-holding structure is arranged to extend between the pair of sub-frame members so as to contact each of said sub-frame members and position the at least one ignition coil between the pair of sub-frame members; and said coil-holding structure is formed of a material which is both non-metallic and non-magnetic;
   and said frame is configured and arranged to permit traveling wind to impinge on at least one surface of said at least one ignition coil during forward movement of said motorcycle.

2. A motorcycle according to claim 1, wherein said coil-holding structure includes a base for holding said at least one ignition coil, said base having an opening formed therein so as to allow a portion of the ignition coil to face downwardly, and wherein said base extends substantially in a longitudinal direction of a vehicle body.

3. A motorcycle according to claim 2, wherein said engine has a plurality of cylinders, and wherein said at least one ignition coil comprises a plurality of ignition coils, each of said ignition coils being operatively connected with a respective one of said cylinders, wherein said ignition coils are arranged in the longitudinal direction of the vehicle body, and
wherein a first ignition coil of said ignition coils is arranged at a first position on the vehicle body, and a second ignition coil of said ignition coils is arranged at a position lower than and behind said first ignition coil.

4. A motorcycle according to claim 3, wherein said engine is a two-cylinder engine, and wherein said plurality of ignition coils comprises two ignition coils, each of said ignition coils corresponding to a respective one of said two cylinders;
wherein said first ignition coil is installed from above the base so as to allow a portion thereof to face a position below the base through the opening;
and wherein the second ignition coil is installed from below the base so as to allow a portion thereof to face a position above the base through the opening, thereby arranging the second ignition coil below the first ignition coil.

5. A motorcycle according to claim 4, further comprising a hanger bracket for supporting the engine, said hanger bracket comprising a pair of spaced-apart plate members respectively projecting downwardly from the sub-frame members of the main frame member, wherein a gap is formed between the plate members;
and wherein said second ignition coil is disposed above the gap formed between the plate members, whereby said traveling wind is allowed to move past the second ignition coil during said forward movement of the motorcycle.

6. A motorcycle according to claim 4, wherein said non-metallic and non-magnetic material comprises a plastic resin.

7. A motorcycle according to claim 1, wherein said at least one ignition coil is arranged on said coil-holding structure such that during said forward movement of the motorcycle, the traveling wind flows into a gap defined between the main frame member and a cylinder of the engine; and wherein portions of the ignition coil are exposed to the traveling wind, thereby cooling the ignition coil.

8. A motorcycle comprising:
a frame comprising a head pipe, a main frame member extending rearwardly from the head pipe, and a pair of down tubes extending downwardly from the head pipe below the main frame member, wherein the main frame member comprises a pair of sub-frame members arranged in a spaced apart manner in a vehicle width direction;
a fuel tank arranged at a position above the main frame member;
a multi-cylinder engine arranged at a position below the main frame member and comprising a plurality of cylinders;
a coil-holding structure fixed to the main frame member, said coil-holding structure arranged to extend between the pair of sub-frame members of the main frame member in a manner so as to contact each of the sub-frame members; said coil-holding structure extending in a longitudinal direction of the motorcycle;
a plurality of ignition coils arranged in the coil-holding structure at a position below the fuel tank; each of said plurality of ignition coils operatively connected with a respective one of said cylinders of the multi-cylinder engine;
wherein said plurality of ignition coils are arranged in the coil-holding structure, and said frame is configured and arranged such that, during forward movement of said motorcycle, each of said plurality of ignition coils is exposed to a traveling wind, thereby cooling the ignition coils.

9. A motorcycle according to claim 8, wherein said coil-holding structure includes a base portion having an opening formed therein; and wherein said opening extends in the longitudinal direction of the motorcycle.

10. A motorcycle according to claim 8, wherein said multi-cylinder engine is a V-type two-cylinder engine; and wherein said plurality of ignition coils comprises two ignition coils, each of said ignition coils operatively connected with a respective cylinder of said V-type two-cylinder engine.

11. A motorcycle according to claim 10, wherein said ignition coils are arranged in a vertically reversed order on the coil-holding structure, such that when viewed in a side view, output terminals of said ignition coils are positioned at different levels.

12. A motorcycle according to claim 8, wherein the motorcycle further comprises a vehicle body and a hanger bracket for supporting the engine, said hanger bracket comprising a pair of spaced-apart plate members respectively projecting downwardly from the sub-frame members of the main frame member, wherein a gap is formed between the plate members, and
wherein one of said ignition coils is arranged close to a rear side of the vehicle body at a position substantially above the gap formed between the plate members.

13. A motorcycle according to claim 8, wherein the motorcycle further comprises a vehicle body, wherein said plurality of ignition coils are arranged in the longitudinal direction of the motorcycle, and wherein a first ignition coil of said ignition coils is arranged at a first position on the vehicle body, and a second ignition coil of said ignition coils is arranged at a position lower than and behind said first ignition coil.

14. A motorcycle according to claim 13, wherein said coil-holding structure includes a base for holding said at least one ignition coil, said base having an opening formed therein, wherein said first ignition coil is installed from above the base so as to allow a portion thereof to face a position below the base through the opening;
and wherein the second ignition coil is installed from below the base so as to allow a portion thereof to face a position above the base through the opening, thereby arranging the second ignition coil below the first ignition coil.

15. A motorcycle comprising:
a frame structure having a head pipe, a main frame member having a front end portion connected to said head pipe, said main frame member having a pair of sub-frame members arranged in a spaced-apart manner in a vehicle width direction, a down pipe frame member having a front end portion connected to said head pipe at a position below said main frame member,
a coil-holding structure mounted on the main frame member, said coil-holding structure formed of non-metallic and non-magnetic material and arranged to extend between and contact each of the subframe members;
a fuel tank arranged at a position above the main frame member;
a two-cylinder engine arranged at a position below the main frame member; and
a pair of ignition coils disposed in the coil-holding structure at a position below the fuel tank; each of said ignition coils operatively connected with a respective cylinder of said two cylinders of the engine;
wherein said plurality of ignition coils are arranged in the coil-holding structure, and said frame is configured and arranged such that, during forward movement of said motorcycle, each of said ignition coils is exposed to a traveling wind, thereby providing a cooling effect thereto.

16. A motorcycle according to claim 15, wherein the motorcycle further comprises a vehicle body and a hanger bracket for supporting the engine, said hanger bracket comprising a pair of plate members, each projecting downwardly from the pair of sub-frame members of the main frame member, and wherein one of the ignition coils arranged close to a rear side of the vehicle body is arranged substantially directly above a gap formed between the pair of plate members.

17. A motorcycle according to claim 16, wherein said ignition coils are arranged in a series; and wherein one of the ignition coils, which is disposed above the gap between the plate members of the hanger bracket, is situated at a position lower than a position of the other ignition coil.

18. A motorcycle according to claim 15, wherein said coil-holding structure includes a base portion for holding the ignition coils extending in a longitudinal direction of a vehicle body.

19. A motorcycle according to claim 15, wherein said non-metallic and said non-magnetic material comprises a plastic resin.

* * * * *